(12) United States Patent
Baer

(10) Patent No.: US 7,102,682 B2
(45) Date of Patent: Sep. 5, 2006

(54) EXPOSURE CONTROL IN A DIGITAL CAMERA

(75) Inventor: Richard L. Baer, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

(21) Appl. No.: 09/842,549

(22) Filed: Apr. 25, 2001

(65) Prior Publication Data

US 2002/0158986 A1 Oct. 31, 2002

(51) Int. Cl.
*H04N 5/238* (2006.01)
*H04N 5/235* (2006.01)

(52) U.S. Cl. .................................. 348/364; 348/229.1

(58) Field of Classification Search .......... 348/207.99, 348/222.1, 229.1, 230.1, 362–366; 382/168, 382/171, 172
See application file for complete search history.

(56) References Cited

U.S. PATENT DOCUMENTS

| | | | | |
|---|---|---|---|---|
| 5,049,997 A | * | 9/1991 | Arai | 348/364 |
| 5,194,960 A | * | 3/1993 | Ota | 348/362 |
| 5,703,644 A | * | 12/1997 | Mori | 348/363 |
| 5,712,682 A | * | 1/1998 | Hannah | 348/255 |
| 6,141,047 A | * | 10/2000 | Kawai | 348/224.1 |
| 6,151,073 A | * | 11/2000 | Steinberg | 348/364 |
| 6,486,915 B1 | * | 11/2002 | Bell | 348/364 |

FOREIGN PATENT DOCUMENTS

| | | |
|---|---|---|
| EP | 0570968 A2 | 5/1993 |
| WO | WO00/64147 | 11/2000 |

* cited by examiner

*Primary Examiner*—Ngoc-Yen Vu
*Assistant Examiner*—Carramah J. Quiett

(57) ABSTRACT

A method for exposure control which yields exposure settings just high enough to clip light sources and reflections from light sources in an image scene while allocating the majority of image sensor dynamic range to remaining objects in the image scene. Exposure control according to the present techniques includes determining a number of clipped pixels from an image scene for one or more of a set of possible exposures and determining a selected exposure from the possible exposures such that the possible exposures higher than the selected exposure increase the number and the possible exposures less than the selected exposure do not substantially decrease the number.

12 Claims, 4 Drawing Sheets

EXPOSURE CONTROL IN A DIGITAL CAMERA

BACKGROUND OF THE INVENTION

1. Field of Invention

The present invention pertains to the field of exposure control in cameras. More particularly, this invention relates to exposure control in a digital camera.

2. Art Background

Cameras including digital still cameras and video cameras typically include an image sensor and an exposure mechanism for controlling the amount of light from an image scene that reaches the image sensor. Digital cameras, for example, usually include a charge-coupled device (CCD) array as an image sensor along with mechanisms that control aperture and shutter speed exposure settings.

Image scenes often include objects which are very bright in comparison to other objects. For example, light sources such as light bulbs, candles, etc., in a relatively dark image scene are usually very bright in comparison to the remainder of the image scene. In addition, direct reflections of light sources from highly reflective surfaces in an image scene are usually very bright in comparison to the remainder of the image scene.

Exposure control in a camera typically involves determining the exposure settings that best utilize the dynamic range of the image sensor given the characteristics of an image scene being photographed. The dynamic range of an image sensor may be defined as the ratio of its highest possible signal output to its lowest useful signal output. In a CCD array, for example, the highest possible signal output is usually limited by its charge capacity and its lowest useful signal output is usually limited by circuit noise.

Prior methods for exposure control in a camera typically involve measuring the average intensity of light from a sample area of an image scene being photographed and then selecting exposure settings that scale that average to a predetermined percentage of the dynamic range of the image sensor. However, light sources and reflections of light sources in the sample area usually yield a relatively high average intensity. A relatively high average intensity typically results in relatively low exposure settings using prior methods. Such low exposure settings typically reduce the intensity of light obtained from areas of the image scene outside of the light sources and reflections of light sources to the low end of the dynamic range of the image sensor. Unfortunately, this typically causes areas of interest in the image scene to appear too dark once photographed.

SUMMARY OF THE INVENTION

A method for exposure control is disclosed which yields exposure settings just high enough to clip light sources and reflections of light sources in an image scene while allocating the majority of image sensor dynamic range to the remaining objects in the image scene. Exposure control according to the present techniques includes determining a number of clipped pixels from an image scene for one or more of a set of possible exposures and determining a selected exposure from the possible exposures such that the possible exposures higher than the selected exposure increase the number and the possible exposures less than the selected exposure do not substantially decrease the number.

The present techniques yield exposure settings that prevent light sources and reflections from light sources from causing an under exposure of the areas of primary interest in an image scene. Instead, the dynamic range of an image sensor is used to sample the areas of primary interest.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
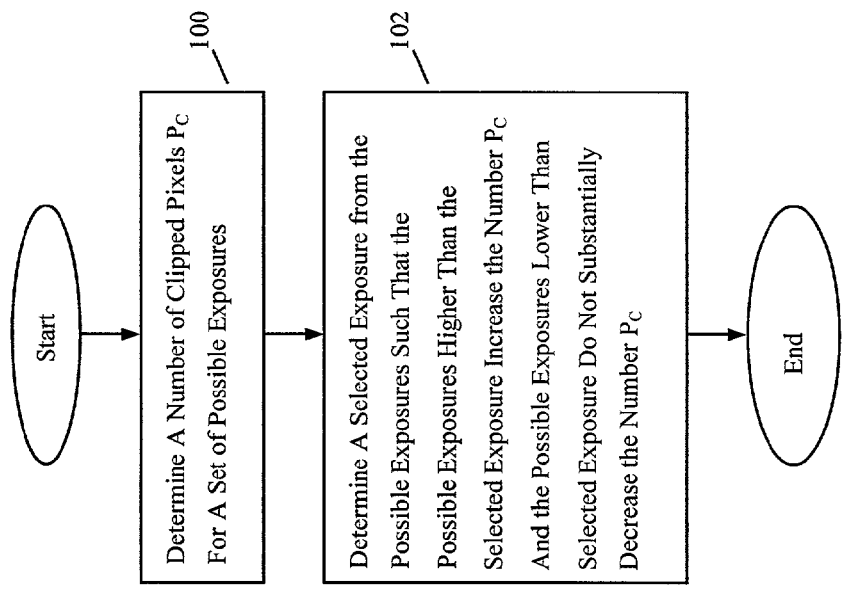
FIG. 1 shows a method for exposure control according to the present teachings.

FIG. 1 shows a method for exposure control according to the present teachings. The method shown may be used for exposure control in a still camera or a video camera.

At step 100, a number of clipped pixels ($P_c$) from an image scene being photographed is determined for each of a set of possible exposures. The arrangement of possible exposures depends on the exposure mechanism in the camera. For example, a camera may provide an aperture mechanism having a set of possible f-stops and a shutter mechanism having a set of possible shutter speeds. The number of clipped pixels at a given exposure depends on the image scene and the dynamic range of the image sensor in the camera.

Step 100 may be performed by photographing an image scene of interest for each possible combination of aperture and shutter speed settings. A starting exposure may be selected and then varied while gathering data on the number of clipped pixels. Step 100 may be performed for the entire image scene being photographed or for a sub-portion of the image scene being photographed.

At step 102, a selected exposure is determined from the possible exposures such that the possible exposures higher than the selected exposure increase the number $P_c$ and the possible exposures less than the selected exposure do not increase the number $P_c$. This yields a selected exposure which clips light sources and reflections of light sources in the image scene and which allocates the majority of the dynamic range of the image sensor to measure light from the remainder of the image scene outside of the light sources and reflections of light sources.

Figure 2:
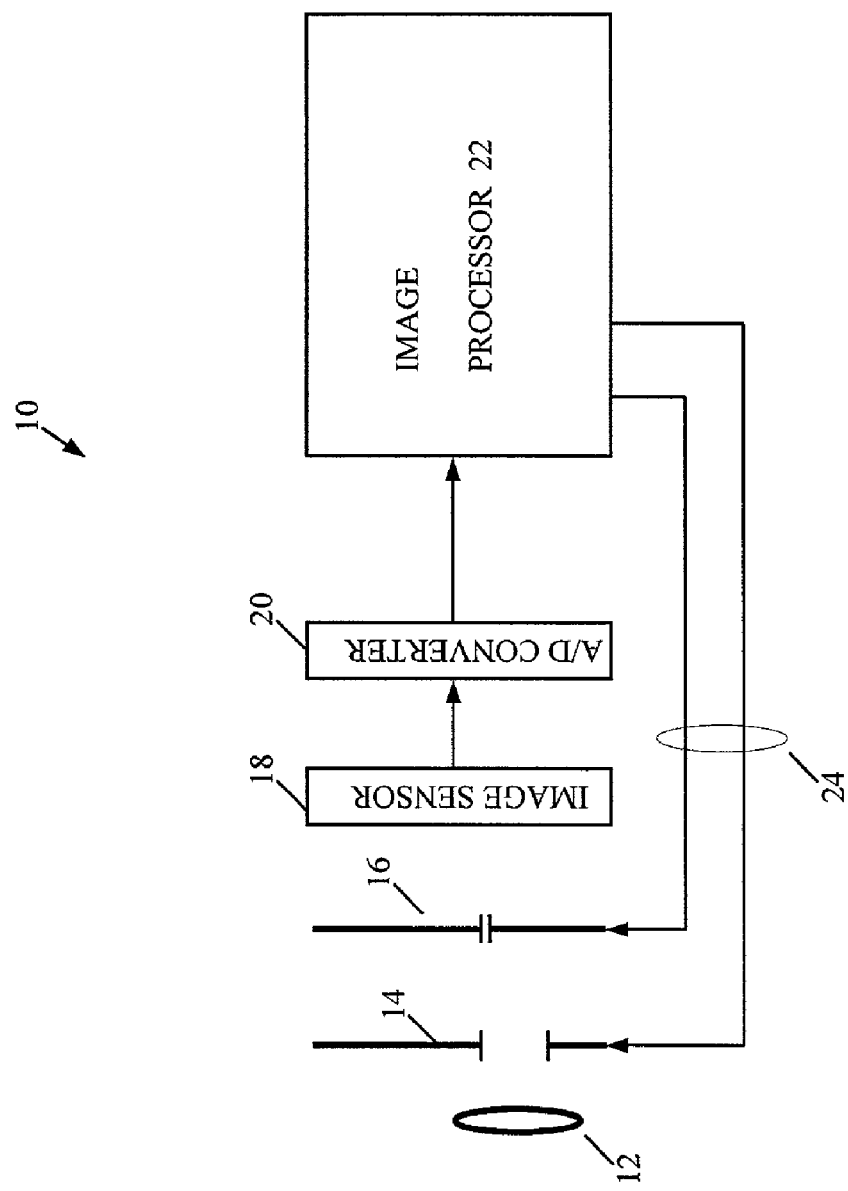
FIG. 2 shows a camera which incorporates the present teachings.

FIG. 2 shows a camera 10 which incorporates the present teachings. The camera 10 includes a lens mechanism 12 that conducts light from an image scene through an aperture mechanism 14 and a shutter mechanism 16 to an image sensor 18. An image processor 22 controls the aperture mechanism 14 and the shutter mechanism 16 via a set of control signals 24.

In one embodiment, the image sensor 18 includes an array of CCD sensors. Each sensor in the array is referred to as a pixel and an image scene sampled by the image sensor 18 is treated as an array of pixel samples. In response to light from an image scene received via the lens mechanism 12, the aperture mechanism 14, and the shutter mechanism 16, the image sensor 18 generates a set of pixel samples and provides the pixel samples to an analog-to-digital (A/D) converter 20. The A/D converter 20 digitizes the pixel samples and provides the corresponding digitized pixel samples to the image processor 22. Each digitized pixel sample is a digital value that indicates a charge amplitude from the corresponding sensing element of the image sensor 18.

The image processor 22 obtains digitized pixel samples from the A/D converter 20 and performs the present techniques for exposure control. The image processor 22 adjusts the aperture mechanism 14 and the shutter mechanism 16 and analyzes the resulting digitized pixel samples to perform step 100. The image processor 22 uses the data gathered at step 100 to determine a selected exposure at step 102 and then sets the selected exposure using the aperture mechanism 14 and the shutter mechanism 16.

In one embodiment, the camera 10 is a still image camera. In another embodiment, the camera 10 is a video camera. The image processor 22 including exposure control functionality may be implemented in hardware and/or software or firmware. The aperture mechanism 14 and the shutter mechanism 16 may be any known mechanisms useful in cameras.

Figure 3:
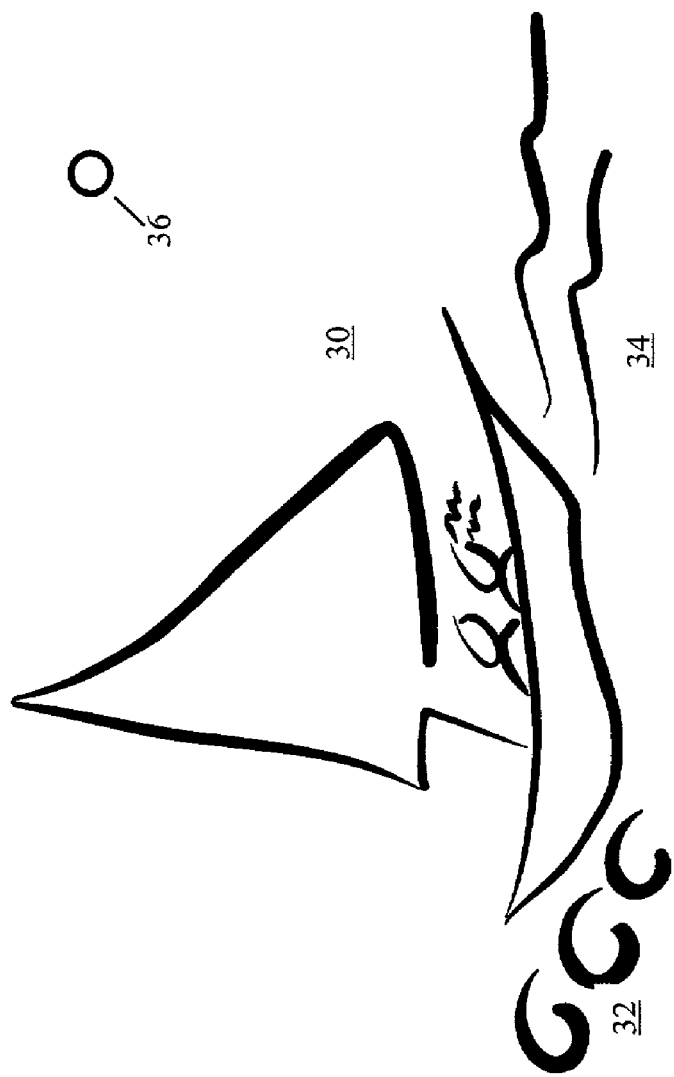
FIG. 3 shows an example image scene for which an image processor determines an exposure using the present techniques.

FIG. 3 shows an example image scene 30 for which the image processor 22 in the camera 10 determines an exposure using the present techniques. The image scene 30 includes a light source 36 and a set of reflecting areas 32–34 which are reflections from the light source 36.

Figure 4:
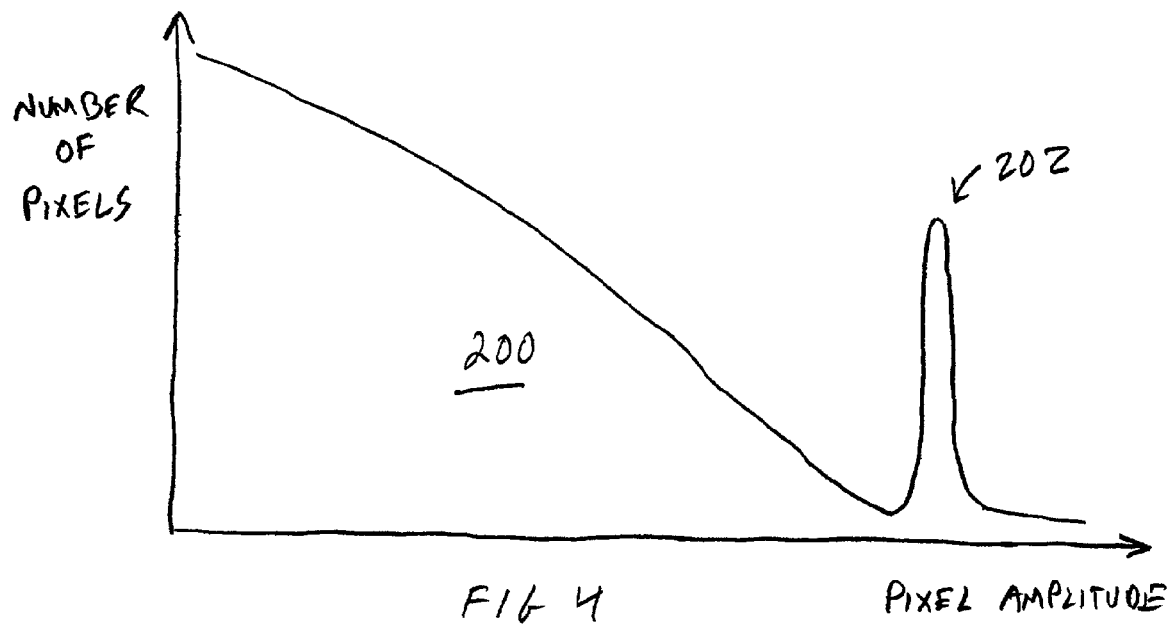
FIG. 4 is a graph that illustrates the determination of the number of clipped pixels in an image scene.

FIG. 4 is a graph 200 that illustrates the determination of the number of clipped pixels in the image scene 30 at step 100. The graph 200 is a histogram for a given exposure setting of the camera 10. The histogram shows the number of digitized pixel samples from the image scene 30 at each possible pixel amplitude.

The graph 200 shows that a relatively large number of digitized pixel samples have a relatively low pixel amplitude. At increasing pixel amplitudes the number of pixels of the image scene 30 having those pixel amplitudes decreases.

At a region 202 of the graph 200, at relatively high pixel amplitudes, the number of pixels jumps to a relatively large number. This corresponds to pixels of the light sources 36 and the reflecting areas 32–34 of the image scene 30. These pixels are clipped by the image sensor 18 at the exposure setting of the camera 10 corresponding to the graph 200. The image processor 22 determines the number of clipped pixels at this exposure by counting the number of pixels having the clipped pixel amplitude.

Figure 5:
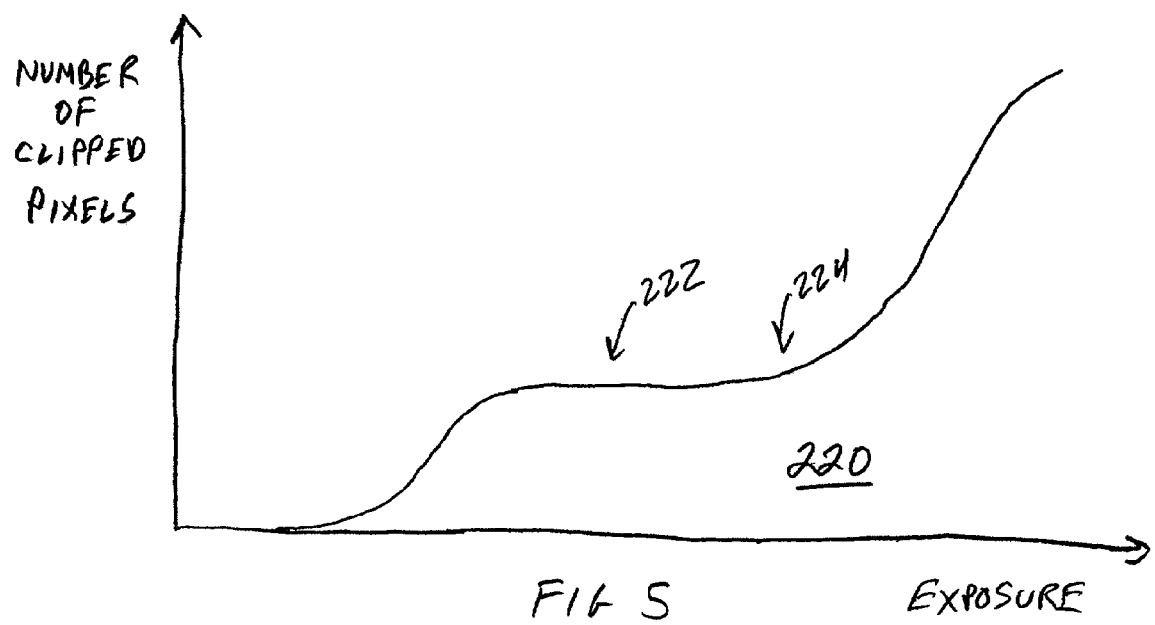
FIG. 5 is a graph that illustrates the determination of a selected exposure from the possible exposures.

FIG. 5 is a graph 220 that illustrates the determination of a selected exposure from the possible exposures at step 102. The graph 220 shows the number of clipped pixels obtained from the image scene 30 verses a range of exposures.

The data for the graph 220 may be obtained by setting a starting exposure in the camera 10 and then determining the number of clipped pixels obtained in response to the image scene 30 at the starting exposure. The exposure of the camera 10 is then progressively increased and decreased from the starting exposure while the number of clipped pixels is determined for each exposure. The starting exposure may be set arbitrarily. Alternatively, the starting exposure may be determined by measuring an average amplitude of digitized pixel samples from the image scene 30 or sub area of the image scene 30 and then setting the starting exposure so that the average is a predetermined percentage of the dynamic range of the image sensor 18.

A region 222 of the graph 220 represents a range in which the number of clipped pixels is not a strong function of the exposure. In the region 222, the graph 220 is relatively flat and the number of clipped pixels is relatively unchanged as the exposure changes. A point 224 of the graph 220 is an exposure at which the number of clipped pixels begins to increase as the exposure increases. The image processor 22 detects the point 224 at step 102 and uses the corresponding exposure as the selected exposure for photographing the image scene 30.

The increase in the number of clipped pixels at point 224 indicates that bright pixels in the image scene 30 outside of the light source 36 and the reflecting areas 32–34 are beginning to be clipped. An exposure setting at point 224 will clip the light source 36 and the reflecting areas 32–34 as is desired and will scale the remaining brightest pixels in the image scene 30 to the top of the dynamic range of the image sensor 18. The lower dynamic range of the image sensor 18 is then available to accurately measure the darker pixels in the image scene 30.

In one embodiment, the camera 10 includes a button that controls when image samples are obtained. The image processor 22 performs the present techniques for exposure control upon first actuation of the button and then obtains image samples on the next actuation of the button using the selected exposure.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for exposure control, comprising:
    obtaining a photograph of an image scene for each of a predetermined set of possible exposures;
    determining a number of clipped pixels in each photograph;
    determining a selected exposure from the possible exposures in response to the numbers of clipped pixels such that the photographs obtained using the possible exposures higher than the selected exposure have an increased value for the number and the photographs obtained using the possible exposures less than the selected exposure do not have a substantially lower value for the number.

2. The method of claim 1, wherein determining a number of clipped pixels comprises:
    measuring an amplitude of each of a set of pixels in the corresponding photograph;
    generating a histogram of a number of the pixels from the corresponding photograph verses the corresponding amplitude;
    detecting a jump in the number of pixels at a high pixel amplitude.

3. The method of claim 1, wherein determining a number of clipped pixels comprises:
    setting a starting exposure and determining the number of clipped pixels from the corresponding photograph for the starting exposure;
    setting a series of increased exposures and determining the number of clipped pixels from the corresponding photographs for the increased exposures;
    setting a series of decreased exposures and determining the number of clipped pixels from the corresponding photographs for the decreased exposures.

4. The method of claim 1, wherein determining a selected exposure comprises:
    determining a subset of the possible exposures for which the number is relatively unchanged;

determining a first one of the possible exposures higher than the subset for which the number increases.

5. An apparatus for exposure control, comprising:
means for obtaining a photograph of an image scene for each of a predetermined set of possible exposures;
means for determining a number of clipped pixels in each photograph;
means for determining a selected exposure from the possible exposures in response to the numbers of clipped pixels such that the photographs obtained using the possible exposures higher than the selected exposure have an increased value for the number and the photographs obtained using the possible exposures less than the selected exposure do not have a substantially lower value for the number.

6. The apparatus of claim 5, wherein the means for determining a number of clipped pixels comprises:
means for measuring an amplitude of each of a set of pixels in the corresponding photograph;
means for generating a histogram of a number of the pixels from the corresponding photograph verses the corresponding amplitude;
means for detecting a jump in the number of pixels at a high pixel amplitude.

7. The apparatus of claim 5, wherein the means for determining a number of clipped pixels comprises:
means for setting a starting exposure and determining the number of clipped pixels from the corresponding photograph for the starting exposure;
means for setting a series of increased exposures and determining the number of clipped pixels from the corresponding photographs for the increased exposures;
means for setting a series of decreased exposures and determining the number of clipped pixels from the corresponding photographs for the decreased exposures.

8. The apparatus of claim 5, wherein the
means for determining a selected exposure comprises:
means for determining a subset of the possible exposures for which the number is relatively unchanged;
means for determining a first one of the possible exposures higher than the subset for which the number increases.

9. A digital camera, comprising: image sensor;
exposure mechanism that provides a predetermined set of possible exposures to the image sensor from an image scene;
image processor that obtains a photograph of an image scene for each of the possible exposures and that determines a number of clipped pixels in each photograph and that determines a selected exposure from the possible exposures in response to the numbers of clipped pixels such that the photographs obtained using the possible exposures higher than the selected exposure have an increased value for the number and the photographs obtained using the possible exposures less than the selected exposure do not have a substantially lower value for the number.

10. The digital camera of claim 9, wherein the image processor determines the number of clipped pixels by using the image sensor to measure an amplitude of each of a set of pixels in the corresponding photograph and then generating a histogram of a number of the pixels from the corresponding photograph verses the corresponding amplitude and then detecting a jump in the number of pixels at a high pixel amplitude.

11. The digital camera of claim 9, wherein the image processor determines the number of clipped pixels by setting a starting exposure using the exposure mechanism and then determining the number of clipped pixels from the corresponding photograph for the starting exposure and setting a series of increased exposures and decreased exposures using the exposure mechanism while determining the number of clipped pixels from the corresponding photographs.

12. The digital camera of claim 9, wherein the image processor determines a selected exposure by determining a subset of the possible exposures for which the number is relatively unchanged and by determining a first one of the possible exposures higher than the subset for which the number increases.

* * * * *